US012584762B2

(12) United States Patent
Zhang et al.

(10) Patent No.: US 12,584,762 B2
(45) Date of Patent: Mar. 24, 2026

(54) SATELLITE SEARCH METHOD AND APPARATUS

(71) Applicant: Huawei Technologies Co., Ltd., Shenzhen (CN)

(72) Inventors: Guangyu Zhang, Shanghai (CN); Yongxiang Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 18/250,425

(22) PCT Filed: Oct. 22, 2021

(86) PCT No.: PCT/CN2021/125565
§ 371 (c)(1),
(2) Date: Apr. 25, 2023

(87) PCT Pub. No.: WO2022/089310
PCT Pub. Date: May 5, 2022

(65) Prior Publication Data
US 2023/0400326 A1       Dec. 14, 2023

(30) Foreign Application Priority Data
Oct. 26, 2020       (CN) .......................... 202011158431.2

(51) Int. Cl.
| | |
|---|---|
| *G01C 21/00* | (2006.01) |
| *B64G 3/00* | (2006.01) |
| *H04W 16/26* | (2009.01) |

(52) U.S. Cl.
CPC ............... *G01C 21/38* (2020.08); *B64G 3/00* (2013.01); *H04W 16/26* (2013.01)

(58) Field of Classification Search
CPC ................................ H04B 17/318; B64G 3/00
(Continued)

(56) References Cited

U.S. PATENT DOCUMENTS

| | | | |
|---|---|---|---|
| 6,272,316 | B1 | 8/2001 | Wiedeman et al. |
| 2016/0374047 | A1 | 12/2016 | Reis |

(Continued)

FOREIGN PATENT DOCUMENTS

| | | |
|---|---|---|
| CN | 102202421 A | 9/2011 |
| CN | 103064429 A | 4/2013 |

(Continued)

OTHER PUBLICATIONS

Dang Xiaochao, Satellite receiving technology, Northeast Normal University Press, Jun. 30, 2005, total 1 page.

*Primary Examiner* — Navid Z. Mehdizadeh
*Assistant Examiner* — Vincent Feng
(74) *Attorney, Agent, or Firm* — Conley Rose, P.C.

(57)       ABSTRACT

A satellite search method is applied to a mobile terminal. The satellite search method includes determining, based on location information of the mobile terminal, location information of an available satellite, and three-dimensional (3D) map information, whether a direct line of sight between the mobile terminal and the available satellite is blocked by an obstacle, and determining location information of a target area based on the 3D map information when the direct line of sight is blocked by the obstacle, where the target area includes a direct line of sight between the mobile terminal and the available satellite.

20 Claims, 6 Drawing Sheets

(58) Field of Classification Search
USPC .......................................................... 701/468
See application file for complete search history.

(56) References Cited

U.S. PATENT DOCUMENTS

| | | | | |
|---|---|---|---|---|
| 2018/0270000 | A1 | 9/2018 | Reis et al. | |
| 2018/0316401 | A1* | 11/2018 | Reis | G01S 3/20 |
| 2020/0413224 | A1* | 12/2020 | Lee | H04B 17/318 |

FOREIGN PATENT DOCUMENTS

| | | |
|---|---|---|
| CN | 203352594 U | 12/2013 |
| CN | 103594797 A | 2/2014 |
| CN | 103616700 A | 3/2014 |
| CN | 104391313 A | 3/2015 |
| CN | 204557219 U | 8/2015 |
| CN | 106954223 A | 7/2017 |
| CN | 108540203 A | 9/2018 |
| CN | 111026167 A | 4/2020 |
| EP | 2634599 A1 | 9/2013 |

* cited by examiner

102

101

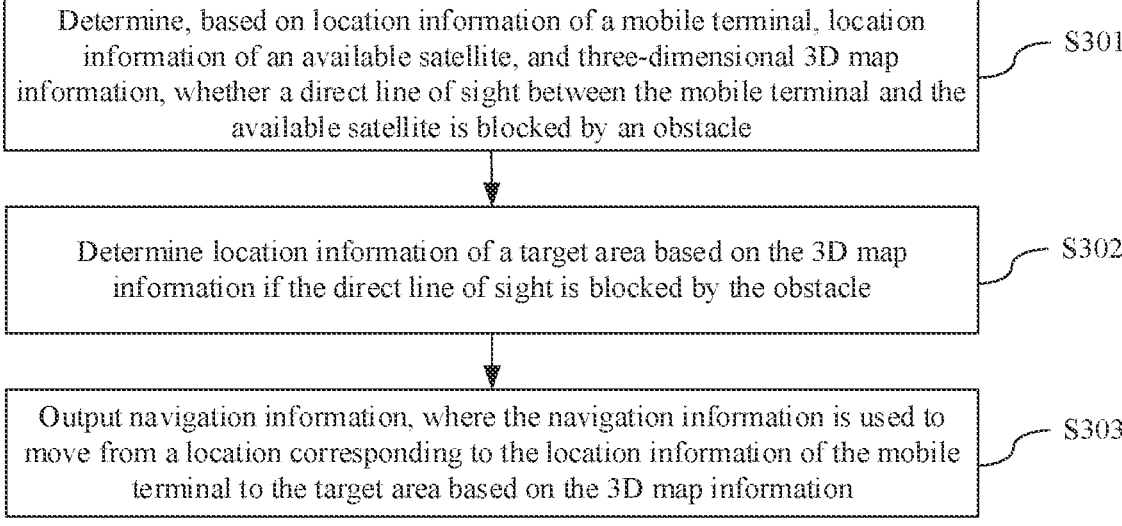

Determine, based on location information of a mobile terminal, location information of an available satellite, and three-dimensional 3D map information, whether a direct line of sight between the mobile terminal and the available satellite is blocked by an obstacle — S301

Determine location information of a target area based on the 3D map information if the direct line of sight is blocked by the obstacle — S302

Output navigation information, where the navigation information is used to move from a location corresponding to the location information of the mobile terminal to the target area based on the 3D map information — S303

FIG. 3

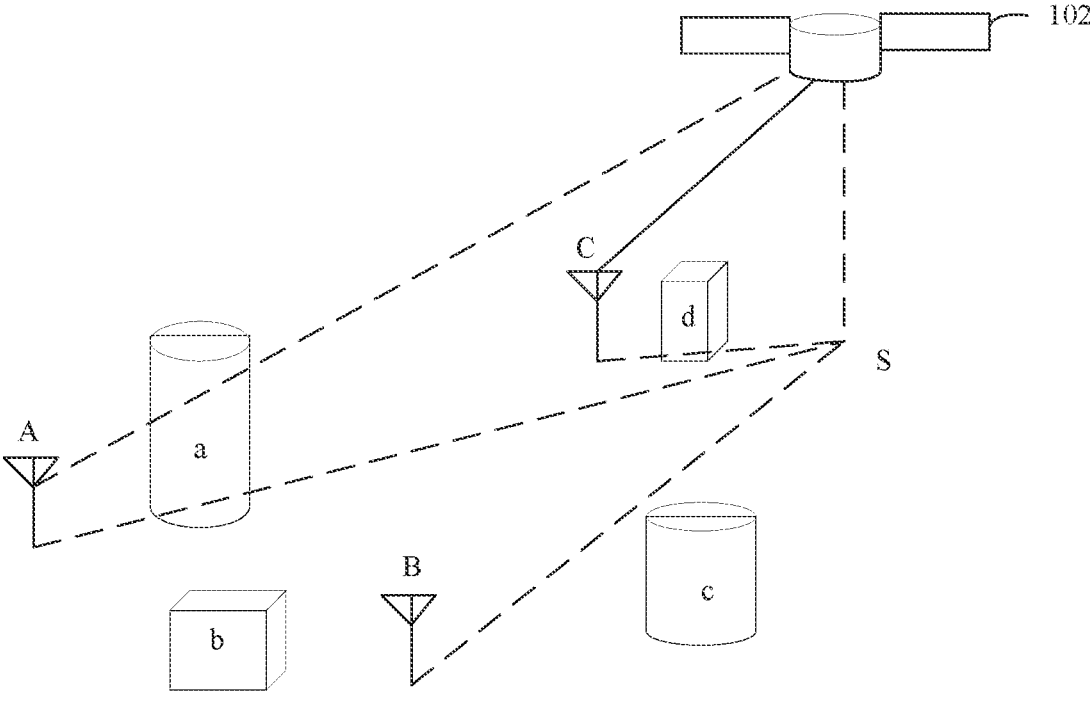

FIG. 4

SATELLITE SEARCH METHOD AND APPARATUS

CROSS-REFERENCE TO RELATED APPLICATIONS

This is a U.S. National Stage of International Patent Application No. PCT/CN2021/125565 filed on Oct. 22, 2021, which claims priority to Chinese Patent Application No. 202011158431.2 filed on Oct. 26, 2020. Both of the aforementioned applications are hereby incorporated by reference in their entireties.

TECHNICAL FIELD

This application relates to the communication field, and in particular, to a satellite search method and apparatus.

BACKGROUND

A satellite communication technology (Satellite communication technology) is a technology that uses an artificial earth satellite as a relay station to realize communication between ground stations. The satellite communication technology has many advantages, such as wide coverage, a large communication capacity, good transmission quality, convenient and fast networking, and easy seamless global connection implementation. This can provide great convenience for a mobile user. For establishing a communication connection between a mobile terminal and a satellite, signal quality of communication between the mobile terminal and the satellite can be ensured only when there is no obstacle (that is, there is a direct line of sight) on a connection line between an antenna of the mobile terminal and the satellite.

Currently, a medium or large communication device (a main body of the device is separated from an antenna of the device) needs to rely on an external device (for example, a satellite finder) to search for a satellite. However, this manner is not applicable to a satellite search operation of the mobile terminal (the antenna of the mobile terminal is integrated with a main body of the mobile terminal). For a mobile terminal that supports satellite search, an antenna usually needs to be placed outside the mobile terminal or an antenna occupies large space inside the mobile terminal. However, in this manner, device costs are high, power consumption is high, and a size of the mobile terminal is also increased. Currently, there is no satellite search manner that is applicable to a mobile terminal and that has low costs, a small size, and low power consumption.

SUMMARY

Embodiments of this application provide a satellite search method and apparatus, to resolve a problem that a satellite search manner is not applicable to a mobile terminal or a mobile terminal that can search for a satellite, and a problem that, in a satellite search manner applicable to a mobile terminal, an antenna needs to be placed outside the mobile terminal or an antenna occupies large space inside the mobile terminal, so that the satellite search manner is applicable to the mobile terminal, and the mobile terminal has low costs, a small size, and low power consumption.

To achieve the foregoing objective, this application uses the following technical solutions.

According to a first aspect, this application provides a satellite search method, applicable to a mobile terminal, including: determining, based on location information of the mobile terminal, location information of an available satellite, and three-dimensional 3D map information, whether a direct line of sight between the mobile terminal and the available satellite is blocked by an obstacle; and if the direct line of sight is blocked by the obstacle, determining location information of a target area based on the 3D map information, where the target area is an area in which there is a direct line of sight between the mobile terminal and the available satellite.

Based on the satellite search method provided in the first aspect, it is determined, based on the location information of the mobile terminal, the location information of the available satellite, and the three-dimensional 3D map information, that the direct line of sight between the mobile terminal and the available satellite is blocked by the obstacle. The location information of the target area is determined based on the 3D map information. The target area is an area in which there is a direct line of sight between the mobile terminal and the available satellite. In this way, the satellite search manner is applicable to the mobile terminal, and an antenna does not need to be placed outside the mobile terminal or an antenna occupies large space inside the mobile terminal, so that the mobile terminal has low costs, a small size, and low power consumption.

In a possible design, the target area may be an area whose distance from the mobile terminal is less than or equal to a preset distance. In this way, the target area is an area whose distance from the mobile terminal is less than or equal to the preset distance, so that time spent by a user from a location at which the mobile terminal is located to reach the target area is the shortest. This improves operation experience of the user.

Optionally, the determining location information of a target area based on the 3D map information may include: determining a candidate area, where the candidate area may be an area whose distance from the mobile terminal is less than or equal to the preset distance, and the candidate area may include a plurality of sub-areas; and determining the target area based on location information of at least one sub-area, the location information of the available satellite, and the 3D map information, where the target area may be a sub-area that is in the plurality of sub-areas and in which there is a direct line of sight to the available satellite.

Alternatively, optionally, the determining location information of a target area based on the 3D map information may include: determining a first included angle between a first connection line and a second connection line based on the 3D map information, where the first connection line may be a connection line between a top of the obstacle and the available satellite, and the second connection line may be a connection line between a projection of the available satellite on the ground and the mobile terminal; and determining the target area, where the target area may be an area that is located on an extension line of the second connection line and in which a difference between the first included angle and a second included angle is greater than an included angle threshold, the second included angle may be an included angle between a third connection line and the extension line of the second connection line, and the third connection line may be a connection line between the available satellite and the extension line of the second connection line.

In a possible design, the satellite search method provided in the first aspect may further include: outputting navigation information, where the navigation information is used to move from a location corresponding to the location information of the mobile terminal to the target area based on the 3D map information. In this way, the navigation information can clearly indicate the user how to reach the target area from the location of the mobile terminal, and an operation is convenient. This improves user experience.

In a possible design, the satellite search method provided in the first aspect may further include: obtaining pose information of the mobile terminal if the mobile terminal is already in the target area; determining a maximum gain direction angle of an antenna of the mobile terminal based on an antenna pattern of the antenna and the pose information of the mobile terminal; determining a target direction angle of the available satellite based on the location information of the mobile terminal and the location information of the available satellite; determining a first pose adjustment parameter based on a difference between the maximum gain direction angle and the target direction angle; and outputting prompt information corresponding to the first pose adjustment parameter, where the prompt information is used to adjust the difference between the maximum gain direction angle and the target direction angle to be less than or equal to the angle threshold. In this way, the user may adjust a pose of the mobile terminal based on the output prompt information corresponding to the first pose adjustment parameter, which is convenient and fast. In addition, the first pose adjustment parameter is determined with reference to a factor of the antenna pattern. Therefore, reliability of the determined first pose adjustment parameter is also high.

In a possible design, the prompt information may include one or more of the following: display information, pan-tilt-zoom control information, voice prompt information, or vibration prompt information.

In a possible design, the satellite search method provided in the first aspect may further include: establishing a communication connection between the mobile terminal and the available satellite if the difference between the maximum gain direction angle and the target direction angle is less than or equal to the angle threshold; determining a second pose adjustment parameter if a signal strength of a signal that is sent by the available satellite and that is received by the mobile terminal is less than or equal to a strength threshold; and outputting second prompt information if an actual quantity of adjustments is greater than or equal to a preset quantity of adjustments, where the actual quantity of adjustments is counted once each time the first pose adjustment parameter or the second pose adjustment parameter is determined, and the second prompt information may be information representing a satellite search failure. Therefore, when the actual quantity of adjustments is greater than or equal to the preset quantity of adjustments, it indicates that a communication requirement between the mobile terminal and the available satellite cannot be met by adjusting the pose of the mobile terminal at a current location. In this case, information representing a satellite search failure may be output to prompt the user to change the location. This avoids a waste of time caused by the user continuously adjusting the pose of the mobile terminal at a same location to search for a satellite, improves satellite search reliability, and reduces power consumption of the mobile terminal.

According to a second aspect, an embodiment of this application further provides a satellite search apparatus, applicable to a mobile terminal, and including a determining unit and an obtaining unit. The determining unit is configured to determine, based on location information of the mobile terminal, location information of an available satellite, and three-dimensional 3D map information, whether a direct line of sight between the mobile terminal and the available satellite is blocked by an obstacle. The obtaining unit is configured to obtain location information of a target area based on the 3D map information if the direct line of sight is blocked by the obstacle. The target area may be an area in which there is a direct line of sight between the mobile terminal and the available satellite.

Further, the target area is an area whose distance from the mobile terminal is less than or equal to a preset distance.

Optionally, in a possible design, the obtaining unit is configured to determine a candidate area, where the candidate area is an area whose distance from the mobile terminal is less than or equal to the preset distance, and the candidate area includes a plurality of sub-areas, and the obtaining unit is further configured to obtain the location information of the target area based on location information of at least one sub-area, the location information of the available satellite, and the 3D map information, where the target area may be a sub-area that is in the plurality of sub-areas and in which there is a direct line of sight to the available satellite.

Alternatively, optionally, in another possible design, the obtaining unit is configured to determine a first included angle between a first connection line and a second connection line based on the 3D map information, where the first connection line may be a connection line between a top of the obstacle and the available satellite, and the second connection line may be a connection line between a projection of the available satellite on the ground and the mobile terminal; and the obtaining unit is further configured to obtain the location information of the target area, where the target area may be an area that is located on an extension line of the second connection line and in which a difference between the first included angle and a second included angle is greater than an included angle threshold, the second included angle may be an included angle between a third connection line and the extension line of the second connection line, and the third connection line may be a connection line between the available satellite and the top of the obstacle.

In a possible design, the apparatus may further include: an output unit, configured to output navigation information, where the navigation information is used to move from a location corresponding to the location information of the mobile terminal to the target area based on the 3D map information.

In a possible design, the satellite search apparatus provided in the second aspect may further include: the obtaining unit is further configured to obtain pose information of the mobile terminal if the mobile terminal is already in the target area the determining unit is further configured to determine a maximum gain direction angle of an antenna of the mobile terminal based on an antenna pattern of the antenna and the pose information of the mobile terminal; the determining unit is further configured to determine a target direction angle of the available satellite based on the location information of the mobile terminal and the location information of the available satellite; and the determining unit is further configured to determine a first pose adjustment parameter based on a difference between the maximum gain direction angle and the target direction angle.

In a possible design, the satellite search apparatus provided in the second aspect may further include: the output unit is configured to output prompt information corresponding to the first pose adjustment parameter, where the prompt information is used to adjust the difference between the maximum gain direction angle and the target direction angle to be less than or equal to the angle threshold.

In a possible design, the prompt information may include one or more of the following: display information, pan-tiltzoom control information, voice prompt information, or vibration prompt information.

In a possible design, the apparatus may further include a communication unit, configured to establish a communication connection between the mobile terminal and the available satellite if the difference between the maximum gain direction angle and the target direction angle is less than or equal to the angle threshold, where the determining unit is further configured to determine a second pose adjustment parameter if a signal strength of a signal that is sent by the available satellite and that is received by the mobile terminal is less than or equal to a strength threshold; and the output unit is further configured to output second prompt information if an actual quantity of adjustments is greater than or equal to a preset quantity of adjustments, where the actual quantity of adjustments is counted once each time the first pose adjustment parameter or the second pose adjustment parameter is determined, and the second prompt information is information representing a satellite search failure.

It may be understood that the determining unit and the obtaining unit may be integrated into one processing module, or may be separately and independently disposed. This is not limited herein.

Optionally, the apparatus provided in the second aspect may further include a storage module. The storage module stores a program or instructions. When the processing module executes the program or the instructions, the satellite search apparatus provided in the second aspect is enabled to perform the satellite search method according to the first aspect.

Optionally, the apparatus provided in the second aspect may further include a transceiver module. The transceiver module is configured to perform a transceiver function of the apparatus provided in the second aspect. For example, the transceiver module may be configured to receive and send a communication signal transmitted by the available satellite. Further, the transceiver module may include a receiving module and a sending module. The sending module is configured to implement a sending function of the satellite search apparatus provided in the second aspect. The receiving module is configured to implement a receiving function of the satellite search apparatus provided in the second aspect.

It should be noted that the satellite search apparatus provided in the second aspect may be a mobile terminal, a chip (system) or another part or component that may be disposed on the mobile terminal, or an apparatus that includes a mobile terminal. This is not limited in this application.

In addition, for a technical effect of the satellite search apparatus provided in the second aspect, refer to the technical effect of the satellite search method in the first aspect. Details are not described herein again.

According to a third aspect, an embodiment of this application further provides a satellite search apparatus. The satellite search apparatus is configured to perform the satellite search method according to the first aspect of the embodiments of this application.

In addition, for a technical effect of the satellite search apparatus according to the third aspect, refer to the technical effect of the satellite search method according to the first aspect. Details are not described herein again.

According to a fourth aspect, an embodiment of this application further provides another satellite search apparatus. The satellite search apparatus includes a processor, and the processor is configured to perform the satellite search method provided in the first aspect of the embodiments of this application.

In addition, for a technical effect of the satellite search apparatus in the fourth aspect, refer to the technical effect of the satellite search method in the first aspect. Details are not described herein again.

According to a fifth aspect, an embodiment of this application further provides another satellite search apparatus, including a processor, w-here the processor is coupled to a memory.

The processor is configured to execute the computer program stored in the memory, so that the satellite search apparatus performs the satellite search method according to the first aspect of the embodiments of this application.

In addition, for a technical effect of the satellite search apparatus according to the fifth aspect, refer to the technical effect of the satellite search method according to the first aspect. Details are not described herein again.

According to a sixth aspect, an embodiment of this application further provides a satellite search apparatus, including a processor and a memory. The memory is configured to store computer instructions, and when the processor executes the instructions, the satellite search apparatus is enabled to perform the satellite search method according to the first aspect of the embodiments of this application.

In addition, for a technical effect of the satellite search apparatus according to the sixth aspect, refer to the technical effect of the satellite search method according to the first aspect. Details are not described herein again. It should be noted that the satellite search apparatus according to the seventh aspect may be a serving-end device or a network device, or may be a chip (system) or another part or component that may be disposed in a mobile terminal, or may be an apparatus that includes a mobile terminal. This is not limited in this application.

According to a seventh aspect, an embodiment of this application further provides a satellite search apparatus, including a processor and an interface circuit.

The interface circuit is configured to receive code instructions and transmit the code instructions to the processor.

The processor is configured to run the code instructions to perform the method according to the first aspect of the embodiments of this application.

In addition, for a technical effect of the satellite search apparatus according to the seventh aspect, refer to the technical effect of the satellite search method according to the first aspect. Details are not described herein again.

According to an eighth aspect, an embodiment of this application further provides a satellite search apparatus. The satellite search apparatus includes a processor and a transceiver. The transceiver is configured to exchange information between the satellite search apparatus and another satellite search apparatus, and the processor executes program instructions to perform the satellite search method according to the first aspect.

In addition, for a technical effect of the satellite search apparatus according to the eighth aspect, refer to the technical effect of the satellite search method according to the first aspect. Details are not described herein again.

According to a ninth aspect, an embodiment of this application further provides a computer-readable storage medium. The computer-readable storage medium includes a computer program or instructions. When the computer program or the instructions are run on a computer, the computer is enabled to perform the satellite search method according to the first aspect of the embodiments of this application.

In addition, for a technical effect of the computer-readable storage medium according to the ninth aspect, refer to the technical effect of the satellite search method according to the first aspect. Details are not described herein again.

According to a tenth aspect, an embodiment of this application further provides a computer program product. The computer program product includes a computer program or instructions. When the computer program or the instructions are run on a computer, the computer is enabled to perform the satellite search method according to the first aspect of the embodiments of this application.

In addition, for a technical effect of the computer program product according to the tenth aspect, refer to the technical effect of the satellite search method according to the first aspect. Details are not described herein again.

BRIEF DESCRIPTION OF DRAWINGS

FIG. 3 is a schematic flowchart of a satellite search method according to an embodiment of this application;

FIG. 4 is a schematic diagram of an application scenario to which a satellite search method is applicable according to an embodiment of this application;

DESCRIPTION OF EMBODIMENTS

The following describes technical terms in embodiments of this application.

Satellite search: Searching for a location and pose of a mobile terminal when communication signal quality is high during communication between the mobile terminal and a satellite.

Direct line of sight: The direct line of sight is a direct path between a location of a mobile terminal and a location of a satellite without an obstacle.

Satellite ephemeris: The satellite ephemeris is also referred to as two-line orbital element (two-line orbital element, TLE). The satellite ephemeris can accurately predict, describe, and track a running status of a satellite, such as time, a location, and a speed, can place the satellite in three-dimensional space, and describe past, present, and future of the satellite in a three-dimensional manner.

Maximum gain direction angle: The maximum gain direction angle is a direction in which an antenna has a maximum capability of receiving and transmitting signals from a satellite.

Polarization angle: A polarization angle is a direction in which an electric field strength is formed when an antenna radiates.

Azimuth angle: The azimuth angle is an included angle between a connection line between a mobile terminal and a projection of a satellite on the ground and an X-axis of a preset ground coordinate system.

Elevation angle: The elevation angle is an included angle between a connection line between a mobile terminal and a projection of a satellite on the ground and a connection line between the mobile terminal and the satellite.

Location-based service (location-based services, LBS): The location based service uses various positioning technologies to obtain a current location of a mobile terminal, and provides an information resource and a basic service for the mobile terminal through a mobile internet.

The following describes technical solutions of this application with reference to accompanying drawings.

Figure 1:
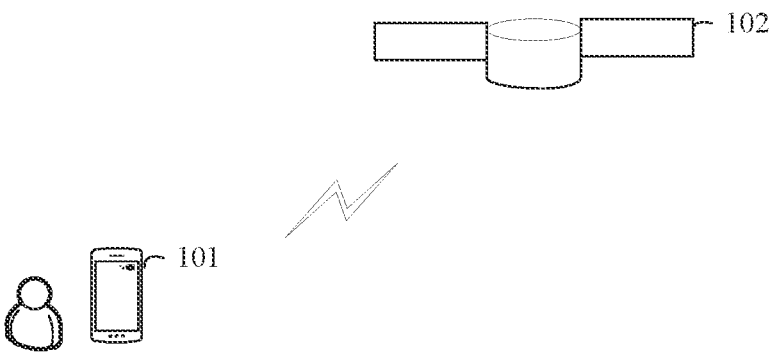
FIG. 1 is a schematic diagram of an architecture of a satellite communication system according to an embodiment of this application.

The technical solutions in the embodiments of this application may be applied to a satellite communication system. As shown in FIG. 1, the satellite search system may include an available satellite 102 and a mobile terminal 101. When there is a direct line of sight between the mobile terminal 101 and the available satellite 102, after capturing a communication signal sent by the available satellite 102, the mobile terminal 101 may send a search signal to the available satellite 102, and after receiving the search signal, the available satellite 102 sends feedback information to the mobile terminal 101. The mobile terminal 101 establishes a communication connection to the available satellite 102 by using the received feedback information.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

In embodiments of this application. "information (information)", "signal (signal)", "message (message)", "channel (channel)", and "signaling (signaling)" may be interchangeably used sometimes. It should be noted that expressed meanings are consistent when differences are not emphasized. Terms "of (of)" and "corresponding (corresponding, related)" may be interchangeably used sometimes. It should be noted that meanings expressed by the terms are consistent when differences of the terms are not emphasized.

In embodiments of this application, sometimes a subscript such as W1 may be written in an incorrect form such as W1. Expressed meanings are consistent when differences between them are not emphasized.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The mobile terminal 101 may also be referred to as a user apparatus, an access terminal, a subscriber unit, a subscriber station, a mobile station, a mobile console, a remote station, a remote terminal, a mobile device, a user terminal, a terminal, a wireless communication device, a user agent, or a user apparatus. The mobile terminal 101 in the embodiments of this application may be a mobile phone (mobile phone), a tablet computer (Pad), a virtual reality (virtual reality. VR) mobile terminal 101, an augmented reality (augmented reality, AR) mobile terminal 101, a wireless terminal in industrial control (industrial control), a wireless terminal in self-driving (self driving), a wireless terminal in remote medical (remote medical), a wireless terminal in a smart grid (smart grid), a wireless terminal in transportation safety (transportation safety), a wireless terminal in a smart city (smart city), or a wireless terminal, a vehicle-mounted terminal, an RSU having a terminal function, an intelligent wearable device (such as a smart wristwatch, a smart band, a smart headset, smart glasses, and a smart helmet) in a smart home (smart home), and the like. The mobile terminal 101 in this application may alternatively be a vehicle-mounted module, a vehicle-mounted module, a vehicle-mounted component, a vehicle-mounted chip, or a vehicle-mounted unit that is built in a vehicle as one or more components or units. The vehicle may implement, by using the vehicle-mounted module, the vehicle-mounted module, the vehicle-mounted component, the vehicle-mounted chip, or the vehicle-mounted unit, the satellite search method provided in this application.

It should be noted that the solutions in this embodiment of this application may be further applied to another mobile terminal, and a corresponding name may also be replaced with a name of a corresponding function in the another mobile terminal 101.

An available satellite in the embodiments of this application is a communications satellite (communications satellite): an artificial earth satellite used as a radio communication relay station. The communications satellite forwards a radio signal to implement communication between satellite communication ground stations (including mobile terminals) or between a ground station and a spacecraft.

Figure 2:
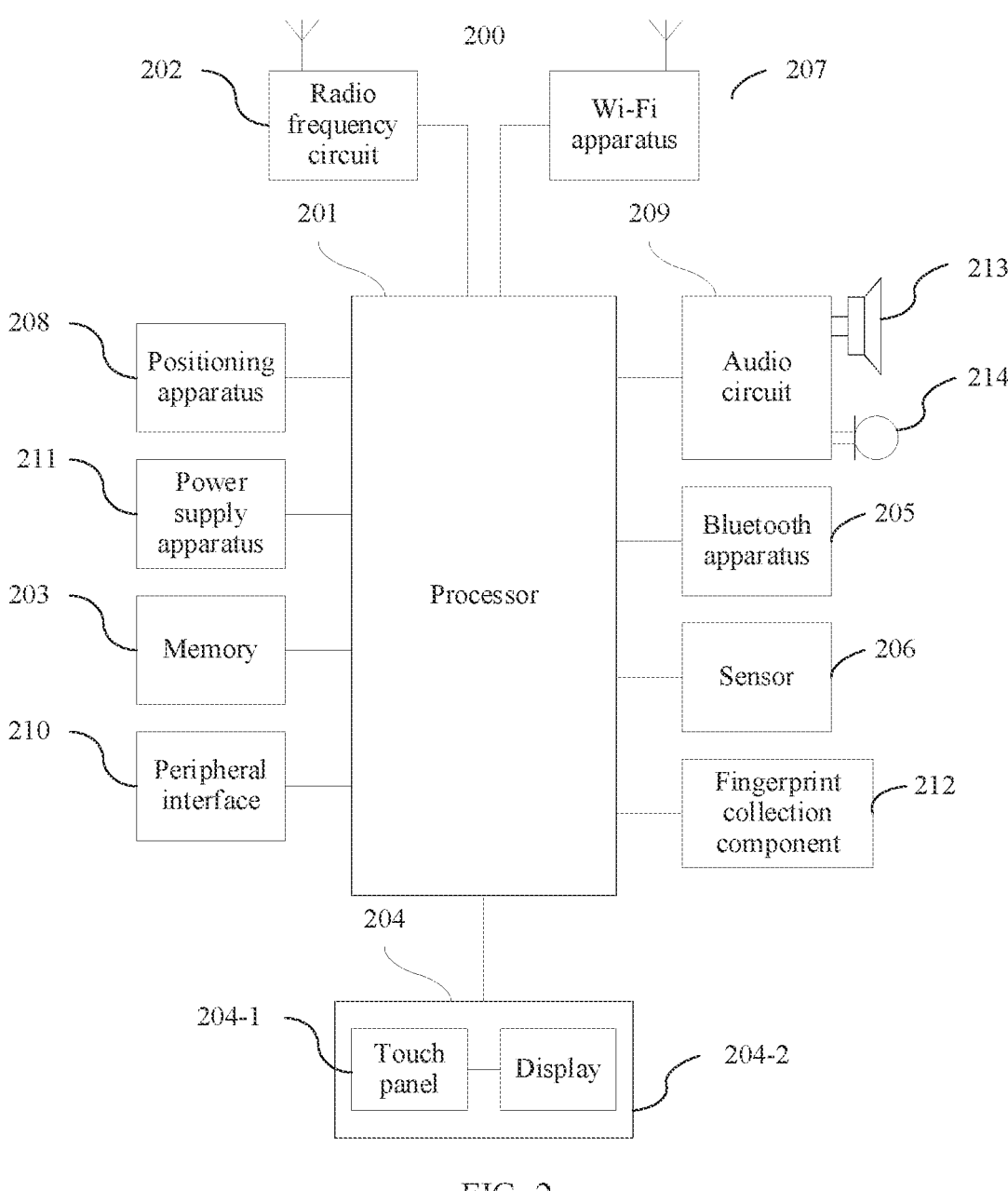
FIG. 2 is a block diagram of a circuit connection of a mobile phone according to an embodiment of this application.

As shown in FIG. 2, the mobile terminal 101 in the embodiments of this application may be a mobile phone 200. The following uses the mobile phone 200 as an example to specifically describe the embodiments. It should be understood that the mobile phone 200 shown in the figure is merely an example of the mobile terminal 101, and the mobile phone 200 may have more or fewer components than those shown in the figure, may combine two or more components, or may have different component configurations.

As shown in FIG. 2, the mobile phone 200 may specifically include components such as a processor 201, a radio frequency (radio frequency. RF) circuit 202, a memory 203, a touchscreen 204, a Bluetooth apparatus 205, one or more sensors 206, a wireless fidelity (wireless fidelity, Wi-Fi) apparatus 207, a positioning apparatus 208, an audio circuit 209, a peripheral interface 210, and a power supply apparatus 211. These components may perform communication through one or more communication buses or signal lines (not shown in FIG. 2). A person skilled in the art can understand that the hardware structure shown in FIG. 2 does not constitute any limitation on the mobile phone. The mobile phone 200 may include more or fewer components than those shown in the figure, or have some components combined, or have different component arrangements.

The components of the mobile phone 200 are specifically described below with reference to FIG. 2.

The processor 201 is a control center of the mobile phone 200, connecting various parts of the mobile phone 200 by using various interfaces and lines, and executing various functions and processes data of the mobile phone 200 by running or executing applications stored in the memory 203 and calling data stored in the memory 203. In some embodiments of this application, the processor 201 may further include a fingerprint verification chip, configured to verify a collected fingerprint.

The radio frequency circuit 202 may be configured to receive and send a radio signal in an information receiving and sending process or in a call process (for example, perform signal interaction with the available satellite 102). Particularly, after receiving downlink data from a base station, the radio frequency circuit 202 may send the downlink data to the processor 201 for processing, and send uplink data to the base station. The radio frequency circuit usually includes but is not limited to an antenna, at least one amplifier, a transceiver, a coupler, a low noise amplifier, a duplexer, and the like. In addition, the radio frequency circuit 202 may further communicate with another device through wireless communication. The wireless communication may use any wireless communication standard or protocol, including but not limited to the global system for mobile communications, general packet radio service, code division multiple access, wideband code division multiple access, long term evolution, email, short message service, and the like.

The memory 203 is configured to store applications and data, and the processor 201 executes various functions of the mobile phone 200 and processes data by running the applications and data stored in the memory 203. The memory 203 mainly includes a program storage area and a data storage area. The program storage area may store an operating system, and an application required by at least one function (such as an audio playback function and an image playback function). The data storage area may store data (such as audio data and a phone book) created based on use of the mobile phone 200. In addition, the memory 203 may include a high-speed random access memory (random access memory. RAM), and may further include a nonvolatile memory such as a magnetic disk storage device, a flash memory, or another volatile solid-state storage device. The memory 203 may store various operating systems, such as an iOS® operating system developed by Apple, and an Android® operating system developed by Google. The memory 203 may be independent, and is connected to the processor 201 by using the communication bus; or the memory 203 may be integrated with the processor 201.

The touchscreen 204 may specifically include a touch panel 204-1 and a display 204-2.

The touch panel 204-1 may collect a touch operation on or near the touch panel 204-1 performed by a user of the mobile phone 200 (for example, an operation performed by the user on or near the touch panel 204-1 by using any applicable object, for example, a finger or a stylus), and send the collected touch information to another device (for example, the processor 201). The touch operation near the touch panel 204-1 by the user may be referred to as a hover touch. The hover touch may mean that the user is not required to directly touch the touch panel to select, move or drag a target (for example, a control) but only required to stay near the terminal to perform an intended function. In addition, the touch panel 204-1 may be implemented by using a plurality of types such as resistive, capacitive, infrared, and surface acoustic wave.

The display (also known as a display) 204-2 may be configured to display information input by a user or information provided to the user, and various menus of the mobile phone 200. The display 204-2 may be configured in a form such as a liquid crystal display or an organic light emitting diode. The touch panel 204-1 may cover the display 204-2. After detecting the touch event on or near the touch panel 204-1, the touch panel 204-1 transmits the touch event to the processor 201 to determine a type of the touch event. Then the processor 201 may provide a corresponding visual output on the display 204-2 based on the type of the touch event. In FIG. 2, the touch panel 204-1 and the display 204-2 are used as two standalone components to implement input and output functions of the mobile phone 200. However, in some embodiments, the touch panel 204-1 and the display 204-2 may be integrated to implement the input and output functions of the mobile phone 200. It may be understood that, the touchscreen 204 may be formed by a plurality of stacked layers of materials. Only the touch panel (layer) and the display (layer) are presented in this embodiment of this application. Other layers are not described in this embodiment of this application. In addition, the touch panel 204-1 may be disposed on a front side of the mobile phone 200 in a full panel form, and the display 204-2 may also be disposed on the front side of the mobile phone 200 in a full panel form. In this way, a bezel-less structure can be implemented on the front side of the mobile phone 200.

In addition, the mobile phone 200 may further have a fingerprint recognition function. For example, a fingerprint collection component 212 may be configured on a rear side (for example, below a rear-facing camera) of the mobile phone 200, or a fingerprint collection component 212 may be configured on a front side (for example, below the touchscreen 204) of the mobile phone 200. For another example, a fingerprint collection component 212 may be configured in the touchscreen 204 to implement the fingerprint recognition function. That is, the fingerprint collection component 212 may be integrated with the touchscreen 204 to implement the fingerprint recognition function of the mobile phone 200. In this case, the fingerprint collection component 212 is configured in the touchscreen 204 as a part of the touchscreen 204 or may be configured in the touchscreen 204 in another manner. In the embodiments of this application, a main component of the fingerprint collection component 212 is a fingerprint sensor. The fingerprint sensor may use any type of sensing technology including but not limited to an optical technology, a capacitive technology, a piezoelectric technology, an ultrasonic technology, or the like.

The mobile phone 200 may further include the Bluetooth apparatus 205, configured to implement data exchange (for example, receiving and sending a translated text and a text in an original text) between the mobile phone 200 and another short-distance terminal (for example, a mobile phone or a smartwatch). The Bluetooth apparatus 205 in this embodiment of this application may be an integrated circuit, a Bluetooth chip, or the like.

The mobile phone 200 may further include at least one type of sensor 206, such as a light sensor, a motion sensor, and other sensors. Specifically, the light sensor may include an ambient light sensor and a proximity sensor. The ambient light sensor may adjust luminance of the display of the touchscreen 204 depending on brightness of ambient light, and the proximity sensor may turn off the display when the mobile phone 200 moves to an ear. As a type of motion sensor, an accelerometer sensor may detect magnitudes of accelerations in various directions (typically three axes), and detect a magnitude and a direction of gravity in a still state, and may be applied to mobile phone pose recognition applications (such as landscape/portrait switching, related gaming, and magnetometer pose calibration), and vibration recognition-related functions (such as a pedometer or knock recognition), and the like. For other sensors such as a gyroscope, a barometer, a hygrometer, a thermometer, and an infrared sensor that can also be configured in the mobile phone 200, details are not described herein.

The Wi-Fi apparatus 207 is configured to provide the mobile phone 200 with network access that complies with a Wi-Fi related standard protocol. The mobile phone 200 may access a Wi-Fi access point by using the Wi-Fi apparatus 207, to help the user receive and send information, and provide wireless broadband Internet access for the user. In some other embodiments, the Wi-Fi apparatus 207 may also function as a Wi-Fi wireless access point to provide Wi-Fi network access for another terminal.

The positioning apparatus 208 is configured to provide a geographic location for the mobile phone 200. It may be understood that the positioning apparatus 208 may be specifically a receiver of a positioning system such as a global positioning system (global positioning system, GPS), a BeiDou navigation satellite system, or a Russian GLONASS. After receiving a geographical location sent by the positioning system mentioned above, the positioning apparatus 208 sends the information to the processor 201 for processing, or sends the information to the memory 203 for storage. In some other embodiments, the positioning apparatus 208 may alternatively be a receiver of an assisted global positioning system (assisted global positioning system, AGPS). The AGPS system serves as an assisted server to assist the positioning apparatus 208 in completing ranging and positioning services. In this case, the assisted positioning server communicates with the positioning apparatus 208 (namely, a GPS receiver) of the terminal, for example, the mobile phone 200, through a wireless communication network, to provide positioning assistance. In some other embodiments, the positioning apparatus 208 may alternatively be a locating technology based on a Wi-Fi access point. Each Wi-Fi access point has a globally unique media access control (media access control, MAC) address, and the terminal can scan and collect a broadcast signal of a nearby Wi-Fi access point when the terminal enables Wi-Fi. Therefore, a MAC address that is broadcast by the Wi-Fi access point can be obtained. The terminal sends, to a location server through the wireless communication network, data (for example, the MAC address) that can identify the Wi-Fi access point. The location server obtains a geographical location of each Wi-Fi access point through retrieving, calculates a geographical location of the terminal, and sends the geographical location to the positioning apparatus 208 of the terminal with reference to a strength of a Wi-Fi broadcast signal.

The audio circuit 209, a speaker 213, and a microphone 214 may provide an audio interface between the user and the mobile phone 200. The audio circuit 209 may convert received audio data into an electrical signal and then transmit the electrical signal to the speaker 213, and the speaker 213 converts the electrical signal into an audio signal for outputting. In addition, the microphone 214 converts a captured audio signal into an electrical signal, and the audio circuit 209 converts the received electrical signal into audio data and then outputs the audio data to the RF circuit 202; and then the audio data is transmitted to another mobile phone, or the audio data is output to the memory 203 for further processing.

The peripheral interface 210 is configured to provide various interfaces for an external input/output device (for example, a keyboard, a mouse, a display externally connected to the mobile phone, an external memory, or a subscriber identity module card). For example, the terminal is connected to the mouse through a universal serial bus (universal serial bus, USB) interface. By using a metal contact on a card slot of a subscriber identification module (subscriber identification module, SIM) card provided by a telecommunications operator, the terminal is connected to the subscriber identification module card. The peripheral interface 210 may be configured to couple the external input/output peripheral device to the processor 201 and the memory 203.

The mobile phone 200 may further include a power supply apparatus 211 (for example, a battery and a power management chip) that supplies power to the various components. The battery may be logically connected to the processor 201 by the power management chip, so as to implement functions such as charge management, discharge management, and power consumption management by using the power supply apparatus 211.

It should be noted that the solutions in the embodiments of this application may be further applied to another mobile terminal 101, and a corresponding name may also be replaced with a name of a corresponding function in the another mobile terminal 101.

The following describes in detail a satellite search method provided in the embodiments of this application with reference to FIG. 3.

For example, FIG. 3 is a schematic flowchart of a satellite search method according to an embodiment of this application. The satellite search method is applicable to the foregoing mobile terminal 101, and the mobile terminal 101 is located in the foregoing satellite search system. Referring to FIG. 3, the satellite search method includes the following steps.

S301. Determine, based on location information of the mobile terminal 101, location information of an available satellite 102, and three-dimensional 3D map information, whether a direct line of sight between the mobile terminal 101 and the available satellite 102 is blocked by an obstacle, and if yes, perform S302.

Specifically, the location information of the mobile terminal 101 may include but is not limited to latitude and longitude information obtained from the available satellite 102, and identification information of a base station that is used by the mobile terminal 101 to perform communication and that is obtained from a wireless network. The three-dimensional 3D map information may be obtained from prestored information, where the three-dimensional 3D map information includes a location, a height, and a shape contour of each obstacle on a 3D map. The location information of the satellite includes satellite operating parameters (such as an orbital tilt angle, a satellite distance from the ground, an eccentricity, and an average near-point angle).

For an operation of a user, the user may tap on a system home screen of the mobile terminal 101 to enter a home screen of a target application, and then tap a "start searching for a satellite" touch key on the home screen, to perform S301. The location information of the mobile terminal 101, the location information of the available satellite 102, and the three-dimensional 3D (three-dimensional, 3D) map information may be first obtained. Specifically, a manner of obtaining the location information of the mobile terminal 101 may be but is not limited to obtaining based on an LBS service or obtaining based on a GPS positioning module. A manner of obtaining the location information of the available satellite 102 may be but is not limited to obtaining the location information of the available satellite 102 from a prestored satellite ephemeris. It should be noted that before the location information of the available satellite 102 is obtained, the available satellite 102 needs to be determined from a plurality of satellites based on the location information of the mobile terminal 101 and a plurality of satellite operating parameters that are related to satellite signal coverage and that are included in the prestored ephemeris information. The satellite operating parameter may further include a coverage area of each satellite transmit signal on the earth at different moments and a signal strength of the coverage area.

In addition, a manner of determining the available satellite 102 may be: selecting a satellite whose coverage area includes the location information of the mobile terminal 101 and whose signal strength of the coverage area is greater than a preset threshold within a current moment and preset time after the current moment, and determining the satellite as the available satellite 102. When the location information of the mobile terminal 101, the location information of the available satellite 102, and the location, the height, and the shape contour of each obstacle on the 3D map are known, it may be determined, by using a geometric relationship, that the direct line of sight between the mobile terminal 101 and the available satellite 102 is blocked by the obstacle. The obstacle may be a dense growing vegetation, a geomorphic bulge caused by geological movement, a building, or the like. This is not limited herein.

Specifically, as shown in FIG. 4, FIG. 4 includes a mobile terminal A, a mobile terminal B, a mobile terminal C, an obstacle a, an obstacle b, an obstacle c, and an obstacle d. A projection location of the available satellite 102 on the ground is a point S. Details are described below.

For example, the obstacle a is located on a connection line between the mobile terminal A and the point S. Therefore, the obstacle a may block a direct line of sight between the mobile terminal A and the available satellite 102. In this way, a height of the direct line of sight at a position of the obstacle a may be determined by using a similar triangle principle based on a ratio of a distance from the obstacle a to the mobile terminal A and a distance from the mobile terminal A to the point S, and a distance between the available satellite 102 and the point S, and a height of the obstacle a is identified as higher than the height of the direct line of sight at the position of the obstacle a. In this way, it can be determined that the direct line of sight between the mobile terminal A and the available satellite 102 is blocked by the obstacle.

For another example, the obstacle d is located on a connection line between the mobile terminal C and the point S. Therefore, the obstacle d may block a direct line of sight between the mobile terminal C and the available satellite 102. A height of the direct line of sight at a position of the obstacle d is determined by using a similar triangle principle based on a ratio of a distance from the obstacle d to the mobile terminal C and a distance from the mobile terminal C to the point S, and a distance between the available satellite 102 and the point S, and a height of the obstacle d is identified as lower than the height of the direct line of sight at the position of the obstacle d. In this way, it can be determined that there is a direct line of sight between the mobile terminal C and the available satellite 102.

For another example, the obstacle b and the obstacle c are not located on a connection line between the point S and any mobile terminal 101. Therefore, it may be directly determined that the obstacle b and the obstacle c do not block a direct line of sight between any mobile terminal and the available satellite 102.

S302: Determine location information of a target area based on the 3D map information.

The target area is an area in which there is a direct line of sight between the mobile terminal 101 and the available satellite 102. Because the location information of the available satellite 102, and the location, the height, and the shape contour of each obstacle in the 3D map are known, an area in which there is a direct line of sight between the mobile terminal 101 and the available satellite 102 may be determined by using a geometric relationship.

Further, the target area may be an area whose distance from the mobile terminal 101 is less than or equal to a preset distance. Because the target area may be an area whose distance from the mobile terminal 101 is less than or equal to the preset distance, so that time spent by a user from a location at which the mobile terminal 101 is located to reach the target area is the shortest. This improves operation experience of the user.

Further, in a possible design, the determining location information of a target area based on the 3D map information in S302 may include:

Step A1: Determine a candidate area.

The candidate area may be an area whose distance from the mobile terminal 101 is less than or equal to the preset distance. Optionally, the candidate area may include a plurality of sub-areas.

Figure 5:
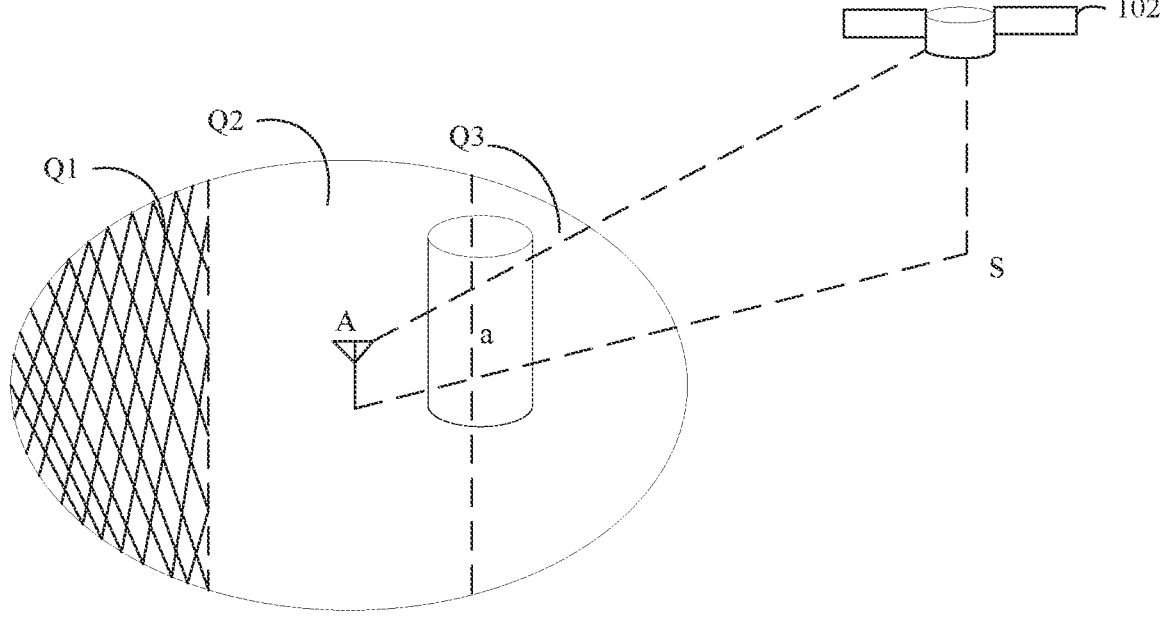
FIG. 5 is a first application scenario applicable to determining a target area according to an embodiment of this application.

Specifically, a circular area or a regular polygon area that is centered on the location of the mobile terminal 101 and whose distance from the mobile terminal 101 is less than the preset distance may be divided, to obtain the candidate area including the plurality of sub-areas. For example, the candidate area may include three, four, eight, or nine sub-areas. This is not limited herein. As shown in FIG. 5, the candidate area is a circular area whose distance from the mobile terminal 101 is less than the preset distance, and the circular area includes three sub-areas (that is, a sub-area Q1, a sub-area Q2, and a sub-area Q3).

Step A2: Determine the target area based on location information of at least one sub-area, the location information of the available satellite 102, and the 3D map information.

The target area may be a sub-area that is in the plurality of sub-areas and in which there is a direct line of sight to the available satellite 102.

Specifically, the target area may be determined in sequence (for example, from left to right or from top to bottom) based on the location information of the sub-area, the location information of the available satellite 102, and the 3D map information. As shown in FIG. 5, an area covered by a shadow part is the determined target area (that is, the sub-area Q1). The location information of the sub-area may be location information of a geometric center of the sub-area. In addition, a manner of determining the target area may be: determining, based on the location information of the sub-area, the location information of the available satellite 102, and the three-dimensional 3D map information, whether a direct line of sight between the sub-area and the available satellite 102 is blocked by an obstacle, and if the direct line of sight is not blocked, determining the sub-area as the target area.

In an implementation, if a first selected sub-area is determined as the target area, the target area is no longer determined based on location information of a subsequent sub-area, the location information of the available satellite 102, and the 3D map information. It should be understood that, if the first selected sub-area is not determined as the target area, a next sub-area is selected to determine whether the sub-area can be used as the target area, and so on, until a selected sub-area is determined as the target area. Specifically, it is assumed that the candidate area includes four sub-areas, and the first sub-area is sequentially traversed. If the first sub-area is not determined as the target area, the second sub-area is traversed. If the second sub-area is determined as the target area, the traversal is stopped, and the second sub-area is used as a finally determined target area.

In another implementation, regardless of whether the first selected sub-area is determined as the target area, whether a second selected sub-area is the target area continues to be determined based on location information of the second selected sub-area, the location information of the available satellite 102, and the 3D map information, and so on, until a selected sub-area is determined as the target area, and a sub-area closest to the location of the mobile terminal 101 is selected from the sub-areas determined as the target area as a final result. Specifically, it is assumed that the candidate area includes four sub-areas, and all sub-areas in the four areas are sequentially traversed. If a sub-area obtained through a second traversal and a sub-area obtained through a fourth traversal are determined as the target area, and a location of the sub-area obtained through the second traversal is closest to the location of the mobile terminal 101, the sub-area obtained through the second traversal is used as the finally determined target area.

Further, in another possible design, the determining location information of a target area based on the 3D map information in S302 may include:

Step B1: Determine a first included angle between a first connection line and a second connection line based on the 3D map information.

The first connection line may be a connection line between a top of the obstacle and the available satellite 102, and the second connection line may be a connection line between a projection of the available satellite 102 on the ground and the mobile terminal 101. Step B2: Determine the target area.

The target area may be an area that is located on an extension line of the second connection line and in which a difference between a first included angle and a second included angle is greater than an included angle threshold. The second included angle may be an included angle between a third connection line and the extension line of the second connection line, and the third connection line may be a connection line between the available satellite 102 and the extension line of the second connection line.

Figure 6:
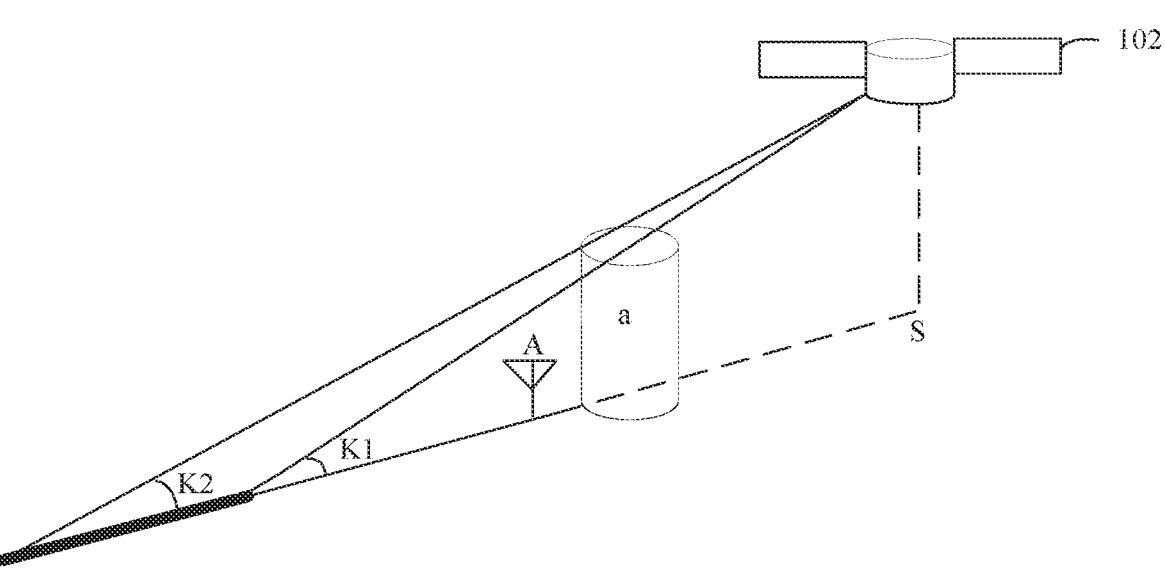
FIG. 6 is a second application scenario applicable to determining a target area according to an embodiment of this application.

A principle of step B1 to step B2 is described with reference to FIG. 6. As shown in FIG. 6, the projection of the available satellite 102 on the ground is a point S, a connection line between the point S and the mobile terminal 101A is the second connection line, a connection line between an obstacle a and the available satellite 102 is the first connection line, and an included angle between the first connection line and the second connection line is K1. It may be understood that a location of the first connection line at an intersection point of the second connection line and the direct line of sight of the available satellite 102 are exactly blocked by a top of the obstacle a. Therefore, on the extension line of the second connection line, in addition, in an area (an area that is on the extension line of the second connection line and that is away from the obstacle a) in which the difference between the first included angle and the second included angle is greater than the included angle threshold, a direct line of sight between the area and the available satellite 102 is not blocked by the obstacle a. Therefore, the area that is located on the extension line of the second connection line and in which the difference between the first included angle and the second included angle is greater than the included angle threshold is determined as the target area (for example, a bold line part in FIG. 6), where the included angle between the third connection line and the extension line of the second connection line is K2.

In a possible design, as shown in FIG. 3, after the determining location information of a target area based on the 3D map information in S302, the method may further include the following steps.

S303. Output navigation information.

The navigation information is used to move from a location corresponding to the location information of the mobile terminal 101 to the target area based on the 3D map information. The navigation information may clearly indicate the user how to reach the target area from the location of the mobile terminal 101. The navigation information is displayed on a display interface of a target application, played by a speaker of the mobile terminal 101, or displayed on the display interface of the application and broadcast by the speaker of the mobile terminal 101.

In a possible design, as shown in FIG. 3, after S303 of outputting navigation information, the method may further include:

S304: Obtain pose information of the mobile terminal 101 if the mobile terminal 101 is already in the target area.

Specifically, the user may hold the mobile terminal 101 to move to the target area based on the navigation information, and obtain the location information of the mobile terminal 101 in a movement process. In this way, whether the mobile terminal 101 is already in the target area can be determined, and if the mobile terminal 101 is already in the target area, the pose information of the mobile terminal 101 is obtained. The pose information of the mobile terminal 101 may include an elevation angle and an azimuth of the mobile terminal 101, and a polarization angle of an antenna.

S305. Determine a maximum gain direction angle of the antenna based on an antenna pattern of the antenna of the mobile terminal 101 and the pose information of the mobile terminal 101.

The antenna pattern of the antenna refers to an included angle of the antenna relative to a vertical direction when the mobile terminal 101 is vertically placed along a long side.

S306: Determine a target direction angle of the available satellite 102 based on the location information of the mobile terminal 101 and the location information of the available satellite 102.

The target direction angle includes a target azimuth angle, a target elevation angle, and a target polarization angle. Specifically, the target azimuth angle may be an included angle between an X-axis of a preset ground coordinate system and a connection line between the antenna and a projection of a satellite on the ground when the mobile terminal 101 is vertically placed along a long side. The target elevation angle may be an included angle between the connection line between the antenna and the projection of the satellite on the ground and a connection line between the mobile terminal 101 and the satellite when the mobile terminal 101 is vertically placed along a long side. The target elevation angle may be a direction in which an electric field strength is formed when the antenna is radiated when the mobile terminal 101 is vertically placed along a long side and the antenna is arranged in a vertical direction.

S307: Determine a first pose adjustment parameter based on a difference between the maximum gain direction angle and the target direction angle.

For example, when the difference is (5 degrees, 10 degrees, or 20 degrees), the first pose adjustment parameter may be "turning forward by 5 degrees, turning left by 10 degrees, and turning down by 20 degrees".

S308: Output prompt information corresponding to the first pose adjustment parameter.

The prompt information is used to adjust the difference between the maximum gain direction angle and the target direction angle to be less than or equal to the angle threshold. The user may adjust a pose of the mobile terminal 101 based on the output prompt information corresponding to the first pose adjustment parameter, which is convenient and fast. In addition, the first pose adjustment parameter is determined with reference to a factor of the antenna pattern. Therefore, reliability of the determined first pose adjustment parameter is also high. The angle threshold may be 2 degrees, 3 degrees, 5 degrees, or the like. This is not limited herein.

Figure 7:
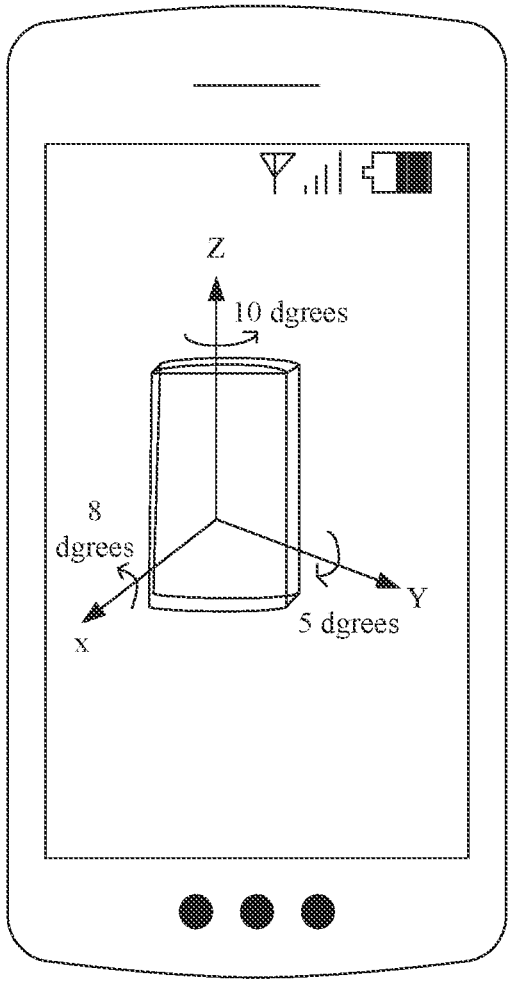
FIG. 7 is a schematic diagram of a display status of prompt information displayed on a mobile terminal according to an embodiment of this application.

In a possible design, the prompt information may include one or more of the following: display information, pan-tilt-zoom control information, voice prompt information, or vibration prompt information. As shown in FIG. 7, the display information may be an adjustment direction guide (for example, an arrow) and an adjustment amplitude (for example, an adjustment angle). The pan-tilt-zoom control information may be an analog signal that carries an adjustment direction and an adjustment amplitude, and the analog signal that carries the adjustment direction and the adjustment amplitude is output to a pan-tilt-zoom controller. The pan-tilt-zoom controller may control, based on the adjustment direction and the adjustment amplitude, a motor to drive the pan-tilt-zoom carrying the mobile terminal 101 to adjust a pose, to automatically adjust the pose of the mobile terminal 101. The voice prompt information may be "rotate clockwise by 10 degrees", "turn up by 5 degrees", and the like. The vibration prompt information may be: controlling a vibration motor of the mobile terminal 101 to vibrate, to prompt the user to adjust the pose of the mobile terminal 101.

It should be noted that, in an adjustment process, if an adjustment direction is correct or incorrect, output prompt information may be different. For example, if the adjustment is correct, the display information may become smaller or a color changes to green, and if the adjustment is incorrect, adjustment error display information may become larger or a color changes to red. For another example, if the adjustment is correct, a vibration/amplitude frequency of the vibration motor becomes smaller, and if the adjustment is incorrect, a vibration/amplitude frequency of the vibration motor becomes larger.

In a possible design, as shown in FIG. 3, after the outputting prompt information corresponding to the first pose adjustment parameter in S308, the method may further include the following step:

S309: Establish a communication connection between the mobile terminal 101 and the available satellite 102 if the difference between the maximum gain direction angle and the target direction angle is less than or equal to the angle threshold.

After the communication connection is established, the mobile terminal 101 sends a communication request to the available satellite 102. After receiving the communication request, the available satellite 102 sends feedback information to the mobile terminal 101. The mobile terminal 101 establishes the communication connection to the available satellite 102 based on the feedback information, so that the mobile terminal 101 can send a communication signal to the available satellite 102 or receive a communication signal sent by the available satellite 102.

S310: Determine a second pose adjustment parameter if a signal strength of a signal that is sent by the available satellite 102 and that is received by the mobile terminal 101 is less than or equal to a strength threshold.

When the signal strength is less than or equal to the strength threshold, it indicates that communication quality between the mobile terminal 101 and the available satellite 102 is poor, and the pose of the mobile terminal 101 needs to be adjusted again. The second pose adjustment parameter is a parameter that needs to be adjusted again. It should be noted that, for a process of determining the second pose adjustment parameter, refer to S304 to S308. Details are not described herein again.

S311: Output second prompt information if an actual quantity of adjustments is greater than or equal to a preset quantity of adjustments.

The actual quantity of adjustments is counted once each time the first pose adjustment parameter or the second pose adjustment parameter is determined, and the second prompt information may be information representing a satellite search failure.

When the actual quantity of adjustments is greater than or equal to the preset quantity of adjustments, it indicates that signal strength of a received signal sent by the available satellite 102 cannot be greater than the strength threshold by adjusting the pose of the mobile terminal 101 at a current location. Therefore, the information representing a satellite search failure may be output to prompt the user to change the location, and the user is prevented from continuously adjusting the pose of the mobile terminal 101 to search for a satellite. This reduces power consumption.

Based on the satellite search method provided in FIG. 3, whether the direct line of sight between the mobile terminal and the available satellite is blocked by the obstacle is determined based on the location information of the mobile terminal, the location information of the available satellite, and the three-dimensional 3D map information. If the direct line of sight is blocked, the location information of the target area is determined based on the 3D map information. The target area is an area in which there is a direct line of sight between the mobile terminal and the available satellite. In this way, the satellite search manner is applicable to the mobile terminal, and an antenna does not need to be placed outside the mobile terminal or an antenna occupies large space inside the mobile terminal, so that the mobile terminal has low costs, a small size, and low power consumption.

Figure 8:
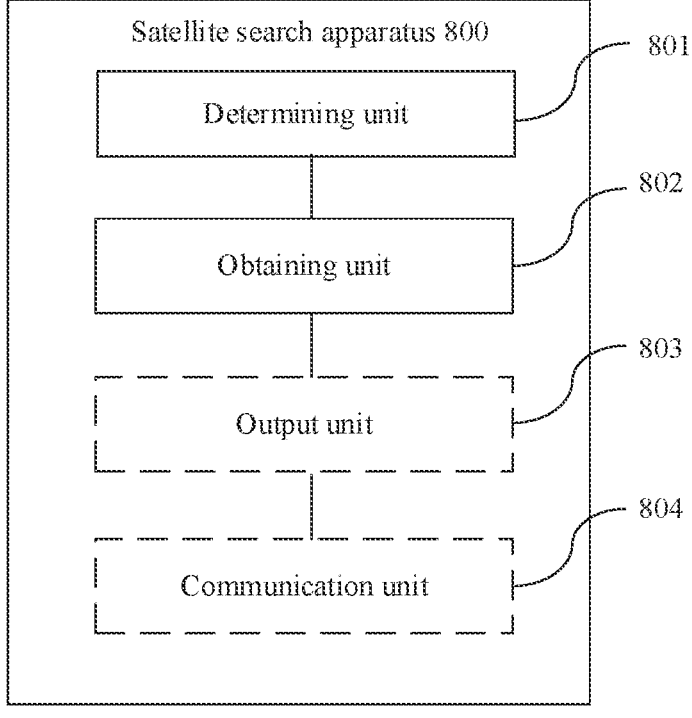
FIG. 8 is a first block diagram of a structure of a satellite search apparatus according to an embodiment of this application.
Figure 9:
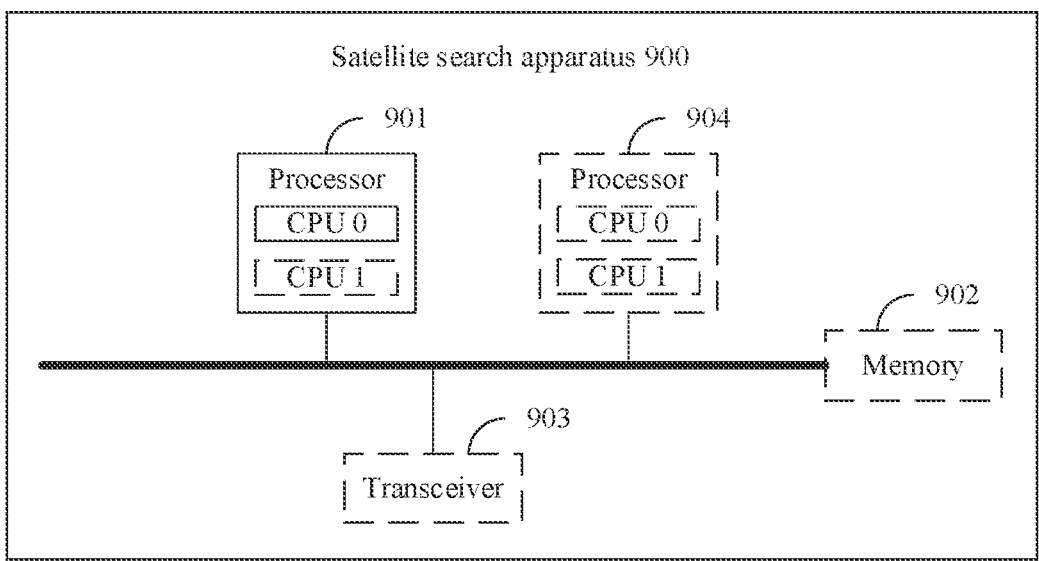
FIG. 9 is a second block diagram of a structure of a satellite search apparatus according to an embodiment of this application.

The foregoing describes in detail the satellite search method provided in the embodiments of this application with reference to FIG. 3 to FIG. 7. With reference to FIG. 8 and FIG. 9, the following describes in detail a satellite search apparatus configured to perform the satellite search method provided in embodiments of this application.

Referring to FIG. 8, an embodiment of this application further provides a satellite search apparatus 800, which may be applied to a mobile terminal 101. The mobile terminal 101 is located in the foregoing satellite search system. It should be noted that, a basic principle and a technical effect of the satellite search apparatus 800 provided in this embodiment of this application are the same as those in the foregoing embodiment. For brief description, for parts that are not mentioned in this embodiment, refer to corresponding content in the foregoing embodiment. The apparatus 800 includes a determining unit 801 and an obtaining unit 802.

The determining unit 801 is configured to determine, based on location information of the mobile terminal 101, location information of an available satellite 102, and three-dimensional 3D map information, whether a direct line of sight between the mobile terminal 101 and the available satellite 102 is blocked by an obstacle.

The obtaining unit 802 is configured to obtain location information of a target area based on the 3D map information if the direct line of sight is blocked by the obstacle. The target area is an area in which there is a direct line of sight between the mobile terminal 101 and the available satellite 102.

Further, the target area is an area whose distance from the mobile terminal 101 is less than or equal to a preset distance.

Further, in a possible design, as shown in FIG. 8, the obtaining unit 802 is configured to determine a candidate area, where the candidate area is an area whose distance from the mobile terminal 101 is less than or equal to a preset distance. The candidate area may include a plurality of sub-areas.

The obtaining unit 802 is further configured to obtain location information of target area based on location information of at least one sub-area, the location information of the available satellite 102, and the 3D map information. The target area is a sub-area that is in the plurality of sub-areas and in which there is a direct line of sight to the available satellite 102.

Further, in another possible design, as shown in FIG. 8, the obtaining unit 802 is configured to determine a first included angle between a first connection line and a second connection line based on the 3D map information. The first connection line is a connection line between a top of the obstacle and the available satellite 102, and the second connection line is a connection line between a projection of the available satellite 102 on the ground and the mobile terminal 101.

The obtaining unit 802 is further configured to obtain the location information of the target area. The target area is an area that is located on an extension line of the second connection line and in which a difference between the first included angle and a second included angle is greater than an included angle threshold, the second included angle is an included angle between a third connection line and the extension line of the second connection line, and the third connection line is a connection line between the available satellite 102 and the top of the obstacle.

In a possible design, as shown in FIG. 8, the apparatus 800 may further include an output unit 803, configured to output navigation information, where the navigation information is used to move from a location corresponding to the location information of the mobile terminal 101 to the target area based on the 3D map information.

In a possible design, as shown in FIG. 8, the obtaining unit 802 may be further configured to obtain pose information of the mobile terminal 101 if the mobile terminal 101 is already in the target area.

The determining unit 801 may be further configured to determine a maximum gain direction angle of an antenna based on an antenna pattern of the antenna of the mobile terminal 101 and the pose information of the mobile terminal 101.

The determining unit 801 may be further configured to determine a target direction angle of the available satellite 102 based on the location information of the mobile terminal 101 and the location information of the available satellite 102.

The determining unit 801 may be further configured to determine a first pose adjustment parameter based on a difference between the maximum gain direction angle and the target direction angle.

The output unit 803 may be configured to output prompt information corresponding to the first pose adjustment parameter, where the prompt information is used to adjust the difference between the maximum gain direction angle and the target direction angle to be less than or equal to the angle threshold.

In a possible design, the prompt information may include one or more of the following: display information, pan-tilt-zoom control information, voice prompt information, or vibration prompt information.

In a possible design, as shown in FIG. 8, the apparatus 800 may further include a communication unit 804, configured to establish a communication connection between the mobile terminal 101 and the available satellite 102 if the difference between the maximum gain direction angle and the target direction angle is less than or equal to the angle threshold.

The determining unit 801 may be further configured to determine a second pose adjustment parameter if a signal strength of a signal that is sent by the available satellite 102 and that is received by the mobile terminal 101 is less than or equal to a strength threshold.

The output unit 803 may be further configured to output second prompt information if an actual quantity of adjustments is greater than or equal to a preset quantity of adjustments, where the actual quantity of adjustments is counted once each time the first pose adjustment parameter or the second pose adjustment parameter is determined, and the second prompt information is information representing a satellite search failure.

It may be understood that, the determining unit 801 and the obtaining unit 802 may be integrated into one processing module, or may be separately and independently disposed. This is not limited herein.

Optionally, the satellite search apparatus 800 may further include a storage module (not shown in FIG. 8), and the storage module stores a program or instructions. When the processing module executes the program or the instructions, the satellite search apparatus 800 may perform a function of the satellite search method shown in FIG. 1.

Optionally, the apparatus 800 may further include a sending module and a receiving module (not shown in FIG. 8). The receiving module is configured to receive a communication signal transmitted by an available satellite, and the sending module is configured to send a communication signal. Optionally, the receiving module and the sending module may be integrated into one transceiver module. The transceiver module is configured to implement a sending function and a receiving function of the satellite search apparatus 800.

It should be understood that the processing module in the satellite search apparatus 800 may be implemented by a processor or a processor-related circuit component, and may be a processor or a processing unit. The transceiver module may be implemented by a transceiver or a transceiver-related circuit component, and may be a transceiver or a transceiver unit.

It should be noted that the satellite search apparatus 800 may be the mobile terminal 101, or may be a chip (system) or another part or component that may be disposed on the mobile terminal 101, or may be an apparatus 800 including the mobile terminal 101. This is not limited in this application.

In addition, for a technical effect of the satellite search apparatus 800, refer to the technical effect of the satellite search method shown in FIG. 2. Details are not described herein again.

For example, FIG. 9 is a schematic diagram of a structure of a satellite search apparatus 900 according to an embodiment of this application. The satellite search apparatus 900 may be the mobile terminal 101, or may be a chip (system) or another component or component that may be disposed in the mobile terminal 101. As shown in FIG. 9, the satellite search apparatus 900 may include a processor 901. Optionally, the satellite search apparatus 900 may further include a memory 902 and/or a transceiver 903. The processor 901 is coupled to the memory 902 and the transceiver 903, for example, may be connected through a communication bus.

The following specifically describes each component of the satellite search apparatus 900 with reference to FIG. 9.

The processor 901 is a control center of the satellite search apparatus 900, and may be one processor, or may be a general term of a plurality of processing elements. For example, the processor 901 is one or more central processing units (central processing unit, CPU), or may be an application-specific integrated circuit (application-specific integrated circuit, ASIC), or may be configured as one or more integrated circuits for implementing the embodiments of this application, for example, one or more microprocessors (digital signal processor, DSP), or one or more field programmable gate arrays (field programmable gate array, FPGA).

Optionally, the processor 901 may run or execute a software program stored in the memory 902, and invoke data stored in the memory 902, to perform various functions of the satellite search apparatus 900.

In a specific implementation, in an embodiment, the processor 901 may include one or more CPUs, for example, a CPU 0 and a CPU 1 shown in FIG. 9.

In specific implementation, in an embodiment, the satellite search apparatus 900 may also include a plurality of processors, for example, the processor 901 and a processor 904 shown in FIG. 2. Each of the processors may be a single-core processor (single-CPU) or may be a multi-core processor (multi-CPU). The processor herein may be one or more devices, circuits, and/or processing cores configured to process data (for example, computer program instructions).

The memory 902 is configured to store a software program for executing the solutions in this application, and the processor 901 controls execution of the software program. For a specific implementation, refer to the foregoing method embodiment. Details are not described herein again.

Optionally, the memory 902 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a read-only disc (compact disc read-only memory, CD-ROM) or another optical disc storage, an optical disc storage (including a compact disc, a laser disc, an optical disc, a digital versatile disc, a Blue-ray disc, or the like), a magnetic disk storage medium or another magnetic storage device, or any other medium that can be used to carry or store expected program code in a form of an instruction or a data structure and that can be accessed by a computer, but is not limited thereto. The memory 902 may be integrated with the processor 901, or may exist independently, and is coupled to the processor 901 by using an interface circuit (not shown in FIG. 9) of the satellite search apparatus 900. This is not specifically limited in this embodiment of this application.

The transceiver 903 is configured to communicate with another satellite search apparatus. For example, the satellite search apparatus 900 is a mobile terminal 101, and the transceiver 903 may be configured to communicate with a network device, or communicate with another mobile terminal 101. For another example, the satellite search apparatus 900 is a network device, and the transceiver 903 may be configured to communicate with the mobile terminal 101, or communicate with another network device.

Optionally, the transceiver 903 may include a receiver and a transmitter (not separately shown in FIG. 9). The receiver is configured to implement a receiving function, and the transmitter is configured to implement a sending function.

Optionally, the transceiver 903 may be integrated with the processor 901, or may exist independently, and is coupled to the processor 901 by using an interface circuit (not shown in FIG. 9) of the satellite search apparatus 900. This is not specifically limited in this embodiment of this application.

It should be noted that a structure of the satellite search apparatus 900 shown in FIG. 9 does not constitute a limitation on the satellite search apparatus. An actual satellite search apparatus may include more or fewer components than those shown in the figure, or combine some components, or have different component arrangements.

In addition, for a technical effect of the satellite search apparatus 900, refer to the technical effect of the communication method in the foregoing method embodiment. Details are not described herein again.

An embodiment of this application further provides a chip system, including a processor, where the processor is coupled to a memory. The memory is configured to store a program or instructions. When the program or the instructions are executed by the processor, the chip system is enabled to implement the method according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (field programmable gate array, FPGA), an application-specific integrated circuit (application-specific integrated circuit, ASIC), a system on a chip (system on a chip, SoC), a central processing unit (central processing unit, CPU), a network processor (network processor, NP), a digital signal processor (digital signal processor, DSP), a micro controller unit (micro controller unit, MCU), a programmable logic device (programmable logic device, PLD), or another integrated chip.

An embodiment of this application provides a satellite communication system. The satellite communication system includes the one or more mobile terminals and one or more available satellites.

It should be understood that, the processor in embodiments of this application may be a central processing unit (central processing unit, CPU). The processor may be further another general-purpose processor, a digital signal processor (digital signal processor. DSP), an application-specific integrated circuit (application-specific integrated circuit, ASIC), a field programmable gate array (field programmable gate array. FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM), used as an external cache. Through an example rather than a limitative description, random access memories (random access memory, RAM) in many forms may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (read-only memory. ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a mobile terminal, wherein the method comprises:

determining a target direction angle of a satellite based on a first location information of the mobile terminal and a second location information of the satellite, wherein the target direction angle includes a target azimuth angle and a target elevation angle;

determining, based on a difference between a maximum gain direction angle of an antenna of the mobile terminal and the target direction angle, a first pose adjustment parameter for adjusting a pose of the mobile terminal, wherein the maximum gain direction angle is based on an antenna pattern of the antenna and the pose of the mobile antenna;

outputting prompt information corresponding to the first pose adjustment parameter, wherein the prompt information instructs a user to adjust a pose of the mobile terminal;

receiving adjustments of the user to the pose of the mobile terminal; and establishing a communication connection to the satellite when the difference between the maximum gain direction angle and the target direction angle is less than or equal to an angle threshold.

2. The method of claim 1, wherein the prompt information comprises a direction guide of an adjustment direction of the mobile terminal.

3. The method of claim 1, wherein the prompt information in response to correct direction adjustment of the mobile terminal differs from prompt information in response to incorrect direction adjustment of the mobile terminal.

4. The method of claim 3, further comprising changing a color of the prompt information in response to the direction adjustment.

5. The method of claim 1, further comprising:

determining a second pose adjustment parameter when a signal strength of a signal that is sent by the available satellite and that is received by the mobile terminal is less than or equal to a strength threshold; and outputting a second prompt information when an actual quantity of adjustments is greater than or equal to a preset quantity of adjustments, wherein an actual quantity of adjustments is counted once each time the first pose adjustment parameter or the second pose adjustment parameter is determined, and the second prompt information representing a satellite search failure.

6. A mobile terminal comprising:

a memory configured to store instructions; and one or more processors coupled to the memory and configured to execute the instructions to cause the mobile terminal to:

determine a target direction angle of a satellite based on a first location information of the mobile terminal and a second location information of the satellite, wherein the target direction angle includes a target azimuth angle and a target elevation angle;

determine, based on a difference between a maximum gain direction angle of an antenna of the mobile terminal and the target direction angle, a first pose adjustment parameter for adjusting a pose of the mobile terminal wherein the maximum gain direction angle is based on an antenna pattern of the antenna and the pose of the mobile antenna;

output prompt information corresponding to the first pose adjustment parameter, wherein the prompt information instructs a user to adjust a pose of the mobile terminal;

receiving adjustments of the user to the pose of the mobile terminal; and establish a communication connection to the satellite when the difference between the maximum gain direction angle and the target direction angle is less than or equal to the angle threshold.

7. The mobile terminal of claim 6, wherein the prompt information comprises a direction guide of an adjustment direction of the mobile terminal.

8. The mobile terminal of claim 6, wherein the prompt information in response to correct direction adjustment of the mobile terminal differs from prompt information in response to incorrect direction adjustment of the mobile terminal.

9. The mobile terminal of claim 8, wherein the one or more processors are further configured to execute the instructions to cause the mobile terminal to change a color of the prompt information in response to the direction adjustment.

10. A computer program product comprising computer-executable instructions that are stored on a non-transitory computer-readable storage medium and that, when executed by one or more processors, cause a mobile terminal to:

determine a target direction angle of a satellite based on a first location information of the mobile terminal and a second location information of the satellite, wherein the target direction angle includes a target azimuth angle and a target elevation angle;

determine, based on a difference between a maximum gain direction angle of an antenna of the mobile terminal and the target direction angle, a first pose adjustment parameter for adjusting a pose of the mobile terminal wherein the maximum gain direction angle is based on an antenna pattern of the antenna and the pose of the mobile antenna;

output prompt information corresponding to the pose adjustment parameter, wherein the prompt information instructs a user to adjust a pose of the mobile terminal;

receive adjustments of the user to the pose of the mobile terminal; and establish a communication connection to the satellite when the difference between the maximum gain direction angle and the target direction angle is less than or equal to an angle threshold.

11. The computer program product of claim 10, wherein the prompt information comprises a direction guide of an adjustment direction of the mobile terminal.

12. The computer program product of claim 10, wherein the prompt information in response to correct direction adjustment of the mobile terminal that differs from prompt information in response to incorrect direction adjustment of the mobile terminal.

13. The method of claim 1, wherein after establishing a communication connection to the satellite, sending a communication signal to the satellite using the communication connection.

14. The method of claim 2, wherein the prompt information comprises an arrow.

15. The method of claim 1, wherein the prompt information is used to adjust the difference between the maximum gain direction angle and the target direction angle to be less than or equal to the angle threshold.

16. The method of claim 15, wherein the prompt information includes one or more of the following: display information, pan-tilt-zoom control information, voice prompt information, or vibration prompt information.

17. The mobile terminal of claim 6, wherein after establishing a communication connection to the satellite, sending a communication signal to the satellite using the communication connection.

18. The mobile terminal of claim 7, wherein the prompt information comprises an arrow.

19. The mobile terminal of claim 6, wherein the prompt information is used to adjust the difference between the maximum gain direction angle and the target direction angle to be less than or equal to the angle threshold.

20. The mobile terminal of claim 19, wherein the prompt information includes one or more of the following: display information, pan-tilt-zoom control information, voice prompt information, or vibration prompt information.

* * * * *